US012792041B2

(12) United States Patent
Venkataraman et al.

(10) Patent No.: US 12,792,041 B2
(45) Date of Patent: Nov. 10, 2026

(54) SYSTEM AND METHOD FOR NAVIGATING AN AUTONOMOUS ENTITY THROUGH A NAVIGATION SPACE IN REAL TIME

(71) Applicant: HACHIDORI ROBOTICS PRIVATE LIMITED, Bengaluru (IN)

(72) Inventors: Ramanathan Venkataraman, Karnataka (IN); Janakiram Annam, Karnataka (IN)

(73) Assignee: HACHIDORI ROBOTICS PRIVATE LIMITED, Karnataka (IN)

( * ) Notice: Subject to any disclaimer, the term of this patent is extended or adjusted under 35 U.S.C. 154(b) by 433 days.

(21) Appl. No.: 18/251,306

(22) PCT Filed: Oct. 30, 2021

(86) PCT No.: PCT/IN2021/051041
§ 371 (c)(1),
(2) Date: May 1, 2023

(87) PCT Pub. No.: WO2022/097169
PCT Pub. Date: May 12, 2022

(65) Prior Publication Data
US 2023/0409037 A1 Dec. 21, 2023

(30) Foreign Application Priority Data
Nov. 3, 2020 (IN) ............................. 202041048029

(51) Int. Cl.
*G05D 1/00* (2024.01)

(52) U.S. Cl.
CPC ......... *G05D 1/0223* (2013.01); *G05D 1/0274* (2013.01); *G05D 1/028* (2013.01); *G05D 1/0238* (2013.01)

(58) Field of Classification Search
None
See application file for complete search history.

(56) References Cited

U.S. PATENT DOCUMENTS 11,340,079 B1 * 5/2022 Ebrahimi Afrouzi ........................ G01C 21/188
2010/0138110 A1 * 6/2010 Zell .................... B62D 15/0245 701/41

(Continued)

OTHER PUBLICATIONS

Abdulmuttalib T. Rashid, Mattia Frasca, Abduladhem A. Ali, Alessandro Rizzo, Luigi Fortuna, "Multi-robot localization and orientation estimation using robotic cluster matching algorithm", Robotics and Autonomous Systems, vol. 63, Part 1, 2015, pp. 108-121 (Year: 2015).*

(Continued)

*Primary Examiner* — Faris S Almatrahi
*Assistant Examiner* — Selena M Jin
(74) *Attorney, Agent, or Firm* — Joy S Goudie; GoudieLaw, PLLC

(57) ABSTRACT

A method and system are provided for navigating an autonomous entity by using positioning sensors. Using the location information provided by the positing sensing unit, the absolute position unit and the absolute orientation unit provide an instantaneous absolute position and an absolute orientation. The navigation unit navigates between two points using a combination of line segments, each line segment using a multi-stage navigation processes that include ramping-up a speed of the entity, performing a course correction on the entity to orient the entity along a predetermined path, performing a stabilization of navigation of the entity for aligning the entity within a deviation limit from the predetermined path and ramping-down the speed of the entity and stopping navigation upon the entity reaching a predetermined limit from a target location. Drive wheel control unit translates the correction control signal from the navigation units to differential speeds applied on the drive wheels.

9 Claims, 10 Drawing Sheets

(56) References Cited

U.S. PATENT DOCUMENTS

| | | | | |
|---|---|---|---|---|
| 2012/0150440 | A1* | 6/2012 | Sambongi | G01C 21/1654 701/472 |
| 2012/0173185 | A1* | 7/2012 | Taylor | G01S 7/4004 356/243.1 |
| 2012/0271540 | A1* | 10/2012 | Miksa | B60W 30/12 701/409 |
| 2017/0060137 | A1* | 3/2017 | Shitamoto | G05D 1/0221 |
| 2019/0163174 | A1* | 5/2019 | Ko | G05D 1/028 |
| 2019/0323845 | A1* | 10/2019 | Agarwal | B60R 11/04 |
| 2019/0337509 | A1* | 11/2019 | Shalev-Shwartz | B60W 40/105 |
| 2020/0386895 | A1* | 12/2020 | Lee | G01C 21/3658 |
| 2021/0097437 | A1* | 4/2021 | Ludhiyani | B25J 9/163 |
| 2022/0299542 | A1* | 9/2022 | Ramalho Ferreira | G01P 15/08 |
| 2022/0300006 | A1* | 9/2022 | Di Federico | G05D 1/69 |
| 2023/0367330 | A1* | 11/2023 | Morinaga | G05D 1/0268 |

OTHER PUBLICATIONS

J. S. Esteves, A. Carvalho and C. Couto, “Position and Orientation Errors in Mobile Robot Absolute Self-Localization Using an Improved Version of the Generalized Geometric Triangulation Algorithm,” 2006 IEEE International Conference on Industrial Technology, Mumbai, India, 2006, pp. 830-835 (Year: 2006).*

* cited by examiner

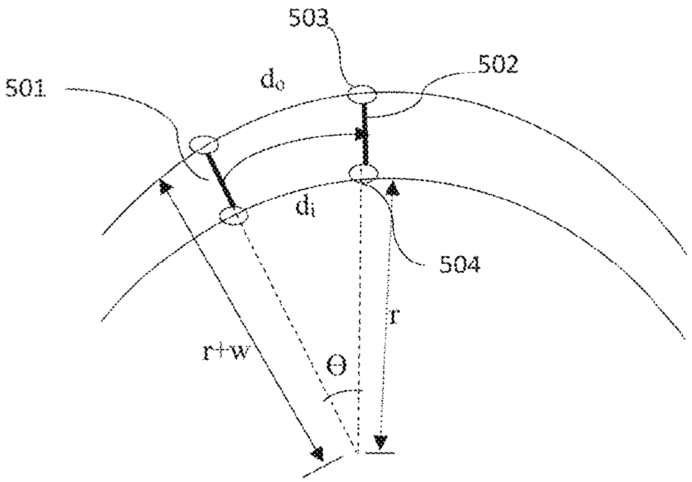

Angular displacement of the outer and the inner wheels are $d_o = (r+w) * \Theta; d_i = r * \Theta$ At unit time, $S_{in} = d_i$ & $S_{out} = d_o$ where $S_{in}$ is the speed of the inner wheel $S_{out}$ is the speed of the outer wheel In effect, $\mathbf{S_{in} = S_{out} - w * \Theta}$ where 'w' is the width of the entity (200), 'Θ' is the desired angular correction to apply Set the outer wheel ($S_{out}$) to current max speed and then derive the inner wheel speed ($S_{in}$)

FIG. 5

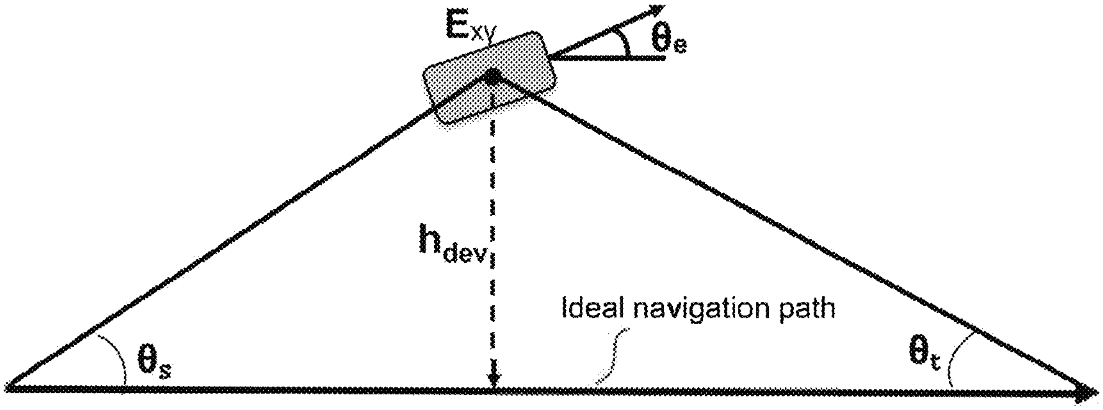

$\theta_s$ – Angle from start to the entity with respect to the ideal navigation path

$\theta_t$ – Angle from target to the entity with respect to the ideal navigation path

$\theta_e$ – Instantaneous absolute orientation of the entity

$E_{xy}$ – Instantaneous absolute position of the entity

$h_{dev}$ – Deviation of the entity from the ideal navigation path

Angular correction factor = f ($\theta_s$, $\theta_t$, $\theta_e$, hdev, $E_{xy}$)

The weightage as well as the usage of these parameters vary across different stages of multi-stage navigation.

One such typical application of these factors:

Course correction stage: Angular correction factor = - Kc * $\theta_s$

Stabilization stage: Angular correction factor = $\eth$ * Ks * ($\theta_t$ + $\theta_e$)

Ramp-down stage: Angular correction factor = ($K_d$ * $h_{dev}$) * $\eth$ * Kr * ($\theta_t$ + $\theta_e$)

where, $K_c$, $K_s$, $K_r$, & $K_d$ are scale factors fine-tuned for a given mechanical design, and $\eth$ is the sign factor which is toggled depending upon entity's position with respect to the ideal path.

FIG. 6

SYSTEM AND METHOD FOR NAVIGATING AN AUTONOMOUS ENTITY THROUGH A NAVIGATION SPACE IN REAL TIME

CROSS-REFERENCE TO RELATED APPLICATIONS

This application is a national stage application of the Patent Cooperation Treaty (PCT) international stage application titled "SYSTEM AND METHOD FOR NAVIGATING AN AUTONOMOUS ENTITY THROUGH A NAVIGATION SPACE IN REAL TIME", numbered PCT/IN2021/051041, filed on Oct. 30, 2021. The aforementioned PCT international phase application claims priority from the Indian Non-Provisional Patent Application (NPA) with serial number 202041048029 filed on 3 Nov. 2020 with the title "SYSTEM AND METHOD FOR NAVIGATING AN AUTONOMOUS ENTITY THROUGH A NAVIGATION SPACE IN REAL TIME" which is granted in the Indian Patent office with the grant no. 417689. The contents of abovementioned PCT and Non-Provisional application are included in entirety as reference herein.

BACKGROUND

Technical Field

The embodiments of the present invention are generally related to autonomous navigation of an entity. The embodiments of the present invention are particularly related to a system and a method for navigating an autonomous entity such as robot (BOT) in a time varying indoor navigation space. The embodiments of the present invention are more particularly related to a system and a method for successfully navigating the autonomous entity such as robot (BOT) autonomously between any two points in a navigation space by providing stabilized control along a desired path of navigation in a cost-effective manner.

Description of the Related Art

Pursuant to an exemplary scenario, navigating an autonomous entity (a mobile object) in a time varying navigating space requires maintaining the entity as close to a predefined path (an ideal path) so as to avoid steering away from the navigation path and colliding with objects adjacent to the desired path. To maintain the entity along the predefined path, an accurate knowledge of the position of the entity with an error of a few centimeters and orientation of the entity, with an error of a few degrees are an absolute necessity. In order to keep the entity in the ideal path and direction, a current position and orientation of the entity needs to be accurately known within a desirable error limit.

Several factors play a critical role when the entity navigates through a narrow passage. For instance, a starting angle (angle or orientation with respect to a predetermined path) of the entity plays a major role in deciding an initial deviation of the entity from the predetermined (ideal) path. Larger the starting angle, faster the deviation. Hence it is critical to minimize the starting angle at the start of the navigation. A larger initial angle from a desired trajectory leads to a huge deviation. As the navigation is initiated, in spite of a starting angle correction, there might still be a residual angle that leads to a wild swing when we try to correct it with basic methods. Typically, navigation with the residual angle leads to a zig-zag movement.

An autonomous entity navigating through a narrow space with an initial angular deviation from the desired path might face static obstacles, like walls adjacent to the desired path, present on the way of navigation of the entity. This would require real-time decision making and dynamic change in navigation strategy so as to correct a course of the autonomous entity to get back on a track.

Operating in a constrained time varying navigation space with dynamically experienced impediments, like uneven surfaces, friction of floor surfaces, dynamic measurement errors etc., influence the navigation path and requires an understanding of the changes and thereby taking corrective measures.

Typically, variety of sensors with specific functions play an important role in providing a required intelligence to the autonomous entity to assess a situation and to make a decision. Usage of dedicated sensors for measuring position, orientation, speed, travelled distance, vision and mapping etc., add to a cost thereby making the autonomous entity a highly expensive one.

In case of a navigation to a specific target through multiple sections of the navigation space to reach a desired target, an identification of an optimal path for a given navigation layout is required.

Hence there is a need for a cost-effective system and method to reliably navigate an autonomous entity (hereafter called the BOT) in a time varying indoor navigation space so as to successfully reach a target accurately with an acceptable level of error (limited only by an accuracy of the mechanism). Further there is a need for an efficient method and system to dynamically change a navigation strategy of an entity (mobile object or robot or BOT) based on time varying impediments so as to reach a target successfully.

The abovementioned shortcomings, disadvantages and problems are addressed herein, which will be understood by reading and studying the following specification.

OBJECTIVES OF THE EMBODIMENTS

A prime object of the embodiment herein is to provide a system and a method to navigate autonomous mobile entity reliably between any two points in a time varying indoor navigation space in a cost-effective manner using a plurality of absolute position sensors, such as UWB (Ultra-Wideband), Bluetooth, Zigbee, Ultrasound etc., thereby eliminating a need for expensive dedicated sensors for identifying and measuring orientation, speed, travelled distance, vision and mapping etc.

Another object of the embodiment herein is to provide a system and a method to find an enhanced instantaneous absolute position and absolute orientation of astatic or mobile entity, using a set of absolute position sensors placed in multi-dimensional space on a course of the entity.

Yet another objective of the embodiment herein is to provide a system and a method to identify an optimal path to reach a target with a complete understanding of all the sections to navigate through and the associated ideal paths based on a pre-recorded guidance of a static characteristics of the navigation space.

Yet another objective of the embodiment herein is to provide a system and a method to achieve a smooth and graceful alignment with a predetermined path based on the absolute orientation of the entity, that is derived using a set of absolute position sensors placed in multi-dimensional space on the said entity, thereby eliminating any uncontrollable wild swing that keeps the entity away from the predetermined path, to reduce a vulnerability of collision with objects adjacent to the navigation path.

Yet another object of the embodiment herein is to provide a system and a method to navigate an entity in a navigation space through a multi-stage navigation process to achieve at least one of reducing a deviation from ideal path, providing an earliest course correction and following through navigation along the pre-determined path and reaching at the target within an acceptable error limit.

Yet another objective of the embodiment herein is to provide a system and a method to perform a self-correction of a navigation trajectory by identifying a correction angle and applying corresponding differential speed signal to the drive wheels throughout a multi-stage navigation process, by determining a course correction and initiation of new cycle of multi-stage navigation, based on an assessment of dynamically experienced conditions like uneven floor surfaces, floor friction conditions/levels, multi-path wireless signal degradation etc., that in turn influence in a measurement/estimation of an instantaneous absolute position and orientation condition.

Yet another objective of the embodiment herein is to provide a system and a method to dynamically change a navigation strategy, when the BOT has deviated from the desired path with an angle and interact with obstacles, like walls present adjacent to the desired path during a navigation of the entity, and a course correction or even initiation of new cycle of multi-stage navigation is required.

Yet another objective of the embodiment herein is to provide a system and a method to repeatedly perform a multi-stage navigation process for each section of a multi section navigation based on the pre-recorded guidance of the static characteristics of the navigation space.

These and other objects and advantages of the embodiments herein will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

According to one embodiment herein, a system for navigating an entity through a navigation space is disclosed. The system includes a position sensing unit comprising a plurality of positioning sensors provided at strategic or preset locations to enable a geometrical inference of the entity, an absolute position unit configured to determine a highly refined representation of an instantaneous absolute position of the entity, an absolute orientation unit configured to determine the absolute orientation of the entity, a navigation guidance unit configured to provide the unique attributes of the navigation layout, a navigation control unit to control navigation of the entity that guarantees stabilized control of the entity throughout the navigation, and a drive wheel control unit that translates the control signals provided by the navigation control unit to differential speeds applied on the drive wheels.

According to one embodiment herein, the position sensing unit comprises a plurality of positioning sensors disposed on a plurality of pre-defined points in a multi-dimensional space on the entity. These pre-defined points on the entity enables a geometrical inference of these positions on the said entity. Collection of these individual sensor locations along with their known geometric relationship enables to derive a highly refined representation of the absolute position and absolute orientation, which are the two critical parameters to achieve an autonomous navigation, of the entity According to one embodiment herein, the absolute position unit uses the individual location information of the plurality of sensors provided by the position sensing unit to derive a refined representation of the instantaneous absolute position of the entity based on the known geometrical relationship of the individual locations and their multi-dimensional spatial diversity.

According to one embodiment herein, the absolute orientation unit uses the time-averaged individual location information of the plurality of sensors, provided by the position sensing unit and the specific pre-defined points in the entity, to construct a set of unique vectors and derives the orientation of the entity. The set of unique vectors are constructed using a combination of these pre-defined points, having a preset angular relationship with the absolute of the entity.

According to one embodiment herein, the navigation guidance unit captures unique attributes extracted from the desired navigable layout identified in the indoor navigation space. In addition to guiding the navigation control unit to relate with the context of the navigation layout and strategize the navigation, the navigation guidance unit also updates the attributes dynamically as a learning based on the past navigation experience/history of the entity. The navigation guidance unit splits/divides a valid navigation path into multiple line segments and selects/decides an optimal combination of these line segments to navigate between any two points in the navigation space.

According to one embodiment herein, the navigation control unit performs navigation between any two points based on a navigation path/strategy provided by the navigation guidance unit. When a specific navigation path between two points requires traversing through multiple line segments, the navigation control unit splits navigation process in to multiple steps corresponding to the number of line segments. For each such line segment, the navigation control unit uses a multi-stage navigation mechanism to ensure stabilized control of the entity and maintain the trajectory of the entity along the ideal/predefined path defined the line segment.

According to one embodiment herein, the multi-stage navigation process in a line segment includes a) ramping-up stage for initiating a navigation of the entity, ramping-up a speed of the entity and deriving a residual angle, b) course-correction stage for performing a course correction on the entity to orient the entity along a predetermined path and compensating for a residual angle c) stabilization stage for performing stabilization of navigation of the entity for aligning the entity within a deviation limit from the predetermined path; and d) ramping-down stage for ramping-down the speed of the entity and stopping navigation upon reaching a distance of the entity from a destination point in the line segment within a predetermined limit.

According to one embodiment herein, the system also includes a drive wheel control unit communicatively coupled to the navigation control unit and configured to control a drive wheel of the entity based on the multi-stage navigation. The drive wheel control unit is communicatively associated with at least one of a left motor and a right motor to control the speed of navigation of the entity.

According to one embodiment herein, the step of initiating the multi-stage navigation process in a line segment includes 1) determining whether an orientation of the entity is aligned within a predetermined target orientation range based on the absolute orientation of the entity 2) ramping-up the speed of the entity without applying any deviation correction as long as the deviation of the entity from the ideal-path is within acceptable limits; 3) ramping up the speed of the entity along with applying a deviation correction by a residual angle if the deviation of the entity from the ideal-path is beyond the acceptable limits; 4) Performing either step 2 alone or a combination of step 2 and step 3 until the desired maximum speed is reached.

According to one embodiment herein, the step/process of performing the course-correction involves using the residual angle estimated during ramp-up stage and applying the required angular correction to change the course of the entity so as to bring it towards the pre-defined path representing the said line-segment.

According to one embodiment herein, the step/process of performing the stabilization includes 1) determining if a first exit condition is met and wherein the first exit condition is defined as a specific point at which $\Theta 2 < k \Theta 1$, where k is the pre-determined factor that decides the exact transition point, and wherein $\Theta 1$ is the initial angle of the entity from the starting point with respect to the line segment. $\Theta 2$ is the angle of the entity from the starting point with respect to the line segment that keeps varying during course correction as the entity moves towards the pre-defined path representing the line segment, and performing a stabilization when the first exit condition is met, or repeating/continuing the course correction when the first exit condition is not met. The stabilization includes reversing the course correction while aligning the entity parallel to the predetermined path and within a deviation limit; and determining if a deviation of the entity from the predetermined path is within a deviation limit; and aligning the entity along the predetermined path when the entity is within the deviation limit from the predetermined path. During the course of stabilization process, the sign of the angle correction factor is determined so as to maintain the entity within a deviation limit on either side of the predetermined path. In case of the deviation of the entity exceeding beyond preset deviation limit, the course-correction process is repeated.

According to one embodiment herein, the step or the process of ramping-down includes 1) determining if a deviation of the entity from the predetermined path is within a deviation limit, 2) determining if a second exit condition is met, when the deviation is within the preset deviation limit, and wherein the second exit condition is defined as a point in which the remaining distance to the destination point in the line segment is within a predetermined limit; 3) performing the process of ramping down the speed of the entity along with deviation correction to keep the entity along the predetermined path when the second exit condition is met or repeating the stabilization process when the second exit condition is not met, 4) determining if a distance of the entity to the destination point in the line segment is within a predetermined limit/limit based on the instantaneous absolute position of the entity, 5) continuing or repeating the ramping-down process, when the distance of the entity from the target location is not within a predetermined limit, and stopping navigation of the entity when the distance of the entity from the destination point in the line segment is within the predetermined limit.

According to one embodiment herein, a method of navigating an entity through a navigation space is disclosed. The method includes initially determining at least one of an instantaneous absolute position and an absolute orientation of the entity, deciding navigation strategy provided by the navigation guidance unit, splitting the navigation in to multiple steps based on a combination of line segments identified as part of the navigation strategy and performing a multi-stage navigation of the entity for each of those line segments based on the instantaneous absolute position and the absolute orientation of the entity. The multistage navigation process for a line segment includes a) initiating a navigation of the entity and ramping up a speed of the entity, b) performing a course correction on the entity to orient the entity along a predetermined path and compensating for a residual angle, upon reaching a maximum speed, c) performing stabilization of navigation of the entity for aligning the entity within a deviation limit form the predetermined path, d) ramping-down the speed of the entity and stopping navigation upon a distance of the entity upon reaching a predetermined limit from a destination point in the line segment.

According to one embodiment herein, a step or process of initiating the multi-stage navigation in a line segment includes 1) determining if an orientation of the entity is aligned within a predetermined target orientation range based on the absolute orientation of the entity, upon initiating navigation of the entity and 2) performing ramp-up of speed of the entity without applying any deviation correction as long as the deviation of the entity from the ideal-path is within acceptable limits; 3) performing ramp up of speed of the entity along with applying a deviation correction by a residual angle if the deviation of the entity from the ideal-path exceeds acceptable limits; 4) Performing either step 2 alone or a combination of step 2 and step 3 until the desired maximum speed is reached; 5) Finding a better representation of the orientation of the entity by averaging the slopes of the lines connecting the bot positions with the starting point.

According to one embodiment herein, a step or process of course-correction includes changing the course of the entity so as to bring it towards the pre-defined path representing the said line-segment using the residual angle estimated during ramp-up stage and applying the required angular correction.

According to one embodiment herein, a step or process of stabilization includes determining if a first exit condition is met and performing a stabilization when the first exit condition is met, and wherein the first exit condition is defined as a specific point at which $\Theta 2 < k \Theta 1$, where k is the pre-determined factor that decides the exact transition point, and wherein $\Theta 1$ is the initial angle of the entity from the starting point with respect to the line segment. $\Theta 2$ is the angle of the entity from the starting point with respect to the line segment that keeps varying during course correction as the entity moves towards the pre-defined path representing the line segment or repeating/continuing the course correction when the first exit condition is not met. The stabilization includes reversing the course-correction while aligning the entity parallel to the predetermined path and within a deviation limit; and determining if a deviation of the entity from the predetermined path is within a deviation limit; and aligning the entity along the predetermined path when the entity is within the deviation limit from the predetermined path. During the course of stabilization, the sign of the angle correction factor is determined so as to maintain the entity within a deviation limit on either side of the predetermined path. In case of the deviation of the entity exceeding beyond the preset deviation limit, course-correction stage/process is repeated.

According to one embodiment herein, the step of ramping-down includes 1) determining if a deviation of the entity from the predetermined path is within a deviation limit, 2) determining if a second exit condition is met, when the deviation is within the preset deviation limit, and wherein the second exit condition is defined as a point in which the remaining distance to the destination point in the line segment is within a predetermined limit; 3) performing the process of ramping down the speed of the entity along with deviation correction to keep the entity along the predetermined path when the second exit condition is met or repeating the stabilization process, when the second exit condition is not met, 4) determining if a distance of the entity to the destination point in the line segment is within a predetermined limit based on the instantaneous absolute position of the entity, 5) continuing or repeating the ramping-down process, when the distance of the entity from the destination point in the line segment is not within a predetermined limit, and stopping navigation of the entity when the distance of the entity from the target location is within the predetermined limit.

According to one embodiment herein, a step or process of determining instantaneous position includes deriving a refined representation of the instantaneous absolute position of the entity using the individual location information of the plurality of sensors provided by the position sensing unit, based on the known geometrical relationship of the individual locations and exploiting their multi-dimensional spatial diversity.

According to one embodiment herein, a step or process of finding the absolute orientation involves, constructing a set of unique vectors to derive the orientation of the entity, using the time-averaged individual location information of the plurality of sensors provided by the position sensing unit, and a combination of specific pre-defined points in the entity, and wherein the combination of these pre-defined points, has a known/preset angular relationship with the absolute of the entity.

These and other aspects of the embodiments of the present invention will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments of the present invention include all such modifications.

BRIEF DESCRIPTION OF THE DRAWINGS

The embodiments of the present invention will be better understood from the following detailed description with reference to the drawings, in which:

FIG. 5 illustrates the method to translate angular correction to differential speed to be applied on the drive wheels, according to one embodiment herein.

FIG. 6 illustrates the significance of various parameters used to calculate angle correction factor as part of controlling the entity during navigation, according to one embodiment herein.

Figure 1:
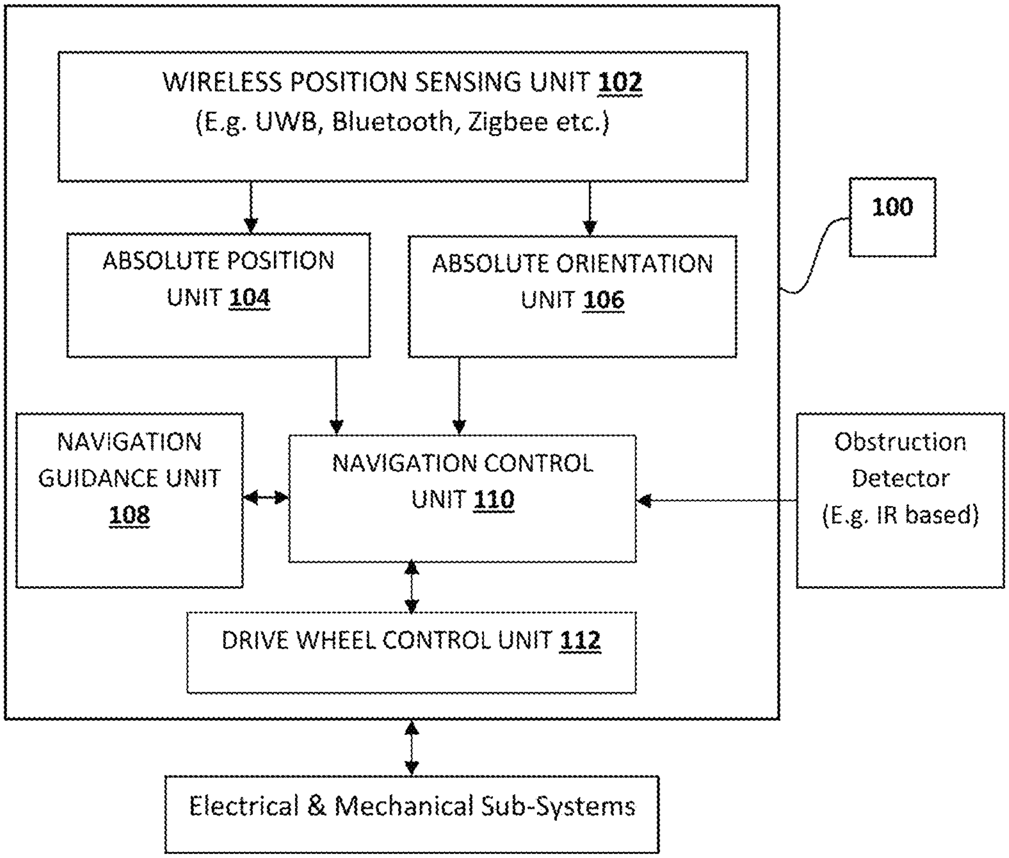
FIG. 1 illustrates a block diagram of a cost-effective system for navigating an entity autonomously between any two points in an indoor navigation space, according to one embodiment herein.

Although the specific features of the embodiments of the present invention are shown in some drawings and not in others. This is done for convenience only as each feature may be combined with any or all of the other features in accordance with the embodiments of the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The embodiments of the present invention and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments of the present invention may be practiced and to further enable those of skill in the art to practice the embodiments of the present invention. Accordingly, the examples should not be construed as limiting the scope of the embodiments of the present invention.

The various embodiments herein provide a method and a system (100) to realize a cost-effective autonomous navigation entity (200) to navigate through a time varying indoor navigation space autonomously just by using indoor positioning sensors. In various embodiments, the method and system disclosed herein uses the instantaneous absolute position and the absolute orientation of the entity obtained from the absolute position unit (104) and the absolute orientation unit (106) respectively to perform autonomous navigation of the entity (200) between any two points in the navigation space reliably. In various embodiments, the method and system disclosed herein divides the navigation path between two points in to multiple line segments based on the navigation strategy guided by the navigation guidance unit (108) and applies a multi-stage navigation mechanism for each such line segment to achieve a smooth and graceful alignment with a predetermined path so as to avoid any uncontrollable wild swing that can lead to a high probability of the entity straying away from the predetermined path thus increasing the vulnerability of collisions. In various embodiments, the method and system disclosed herein perform a multi-stage navigation based on an instantaneous absolute position of the entity obtained from the absolute position unit (104) and an instantaneous absolute orientation of the entity derived from the instantaneous absolute position of the drive wheels obtained from the drive wheel control unit (112). The multi-stage navigation process achieves at least one of a) minimizing deviation from ideal path, 2) earliest course correction and follow through navigation in a straight line, and 3) graceful arrival at the target in a straight line parallel to the predetermined (ideal) path.

According to one embodiment herein, a system for navigating an entity through a navigation space is disclosed. The system includes a position sensing unit (102) comprising of a plurality of positioning sensors disposed on a plurality of pre-defined points in a multi-dimensional space on the said entity (200) in a meaningful manner thus enabling geometrical inference of the said entity (200), an absolute position unit (104) configured to determine the instantaneous position of the entity, an absolute orientation unit (106) configured to determine the absolute orientation of the entity which is generally used during initial alignment of the entity towards the target in a line segment, a navigation guidance unit (108) that provides unique attributes of the navigable layout identified in the navigation area, a navigation control unit (110) that performs navigation of the said entity (200) between any two points in the navigation space based on a strategy guided by the navigation guidance unit (108) so as to reach the desired target successfully, and a drive wheel control unit (112) that controls the drive wheels of the entity (200) based on the instantaneous angular correction input received from the navigation control unit (110)

According to one embodiment herein, the position sensing unit (102) comprises a plurality of positioning sensors, placed in a meaningful manner and configured to provide an approximate representation of location of each individual sensor based on UWB (Ultra-Wideband), Bluetooth, Zigbee, Ultrasound technology, etc. with known inaccuracies and fluctuations including multi-path reflections and non-line-of-sight (NLOS) factors. The plurality of sensor locations along with their known geometric relationship enables us to derive a highly refined representation of the absolute position and absolute orientation, the two critical parameters required to realize autonomous navigation, of the entity (200).

According to one embodiment herein, the absolute position unit (104) provides instantaneous absolute position of the said entity (200) with an accuracy that enables extracting various derived parameters that play a crucial role in navigating the entity autonomously. The instantaneous absolute position of the said entity (200) is derived from the location of individual sensors provided by the position sensing unit (102) based on their known geometrical relationship and exploiting their multi-dimensional spatial diversity.

According to one embodiment herein, the absolute orientation unit (106) provides absolute orientation of the said entity (200) just using the position sensing unit (102) and helps in overcoming the drawbacks of traditional orientation sensors that are highly susceptible to magnetic field of the surroundings. Using the time-averaged individual location information of the pre-defined points on the entity represented by the plurality of sensors provided by the position sensing unit (102), a set of unique vectors are constructed either by connecting any two of these pre-defined points or any two points representing a combination of such pre-defined points. With each of these unique vectors having a known angular relationship with a given axis of the said entity (200) known as the heading or the absolute orientation of the entity, performing angular rotation of those vectors by applying respective offsets followed by weighted averaging provides a reliable absolute orientation of the entity. FIG. 2B illustrates the top view representation of one such embodiment wherein the bold arrow indicates the absolute orientation of the entity and the plurality of sensors (202A to 202H) indicate a representation of pre-defined point with a geometrical relationship.

According to one embodiment herein, the navigation guidance unit (108) provides unique attributes extracted from the desired navigable layout identified in the indoor navigation space that enables the navigation control unit (110). In addition to providing the context of the navigation layout, it also updates some of its own attributes dynamically based on the navigation experience of the entity (200) in the recent past. The entire navigation layout is split into navigable line segments connected by nodes whose absolute coordinates are recorded in a map. All such line segments form part of a set of valid paths leading to a network of valid paths whose attributes like cost, path width, speed limit, intermediate node transition angles, node angular offset, node flags for special purposes etc. are recorded in the map. During navigation, it helps the navigation control unit (110) decide the navigation strategy by deciding the optimal path in real-time based on the current instantaneous absolute position of the entity (200) and the desired target destination. Any measurement offset identified during navigation is captured and recorded in the map for future navigations. E.g. absolute orientation of the entity (200) initially obtained through the absolute orientation unit (106) gets a refined representation during the course navigation. The difference between the two representations provides the angular offset error of the absolute orientation unit (106). Such an error is recorded in the map as a known angle offset at each such node while orienting towards the respective target. During subsequent navigations from the same starting node to the same target, this recorded known offset is applied to the said absolute orientation of the entity (200). This step is iterated during every navigation of each line segment and the angle offset for a given pair of start and end nodes is continuously refined and dynamically updated in the map. The navigation guidance unit (108) can effectively record, share as well as update multiple such attributes that would help enhance the navigation experience. The list of such attributes is only limited by the imagination of the designer.

According to one embodiment herein, the navigation control unit (110) plays a critical in driving the entity (200) autonomously using the inputs from various other units. Based on the navigation strategy guided by the navigation control unit (108), the navigation control unit splits the said navigation in to multiple steps based on the line segments to travel. For each such line segment, the navigation control unit (110) applies a multi-stage navigation mechanism to achieve a smooth and graceful alignment with a predetermined path so as to avoid any uncontrollable wild swing that can lead to a high probability of the entity straying away from the predetermined path thus increasing the vulnerability of collisions. During such multi-stage navigation in a line segment, at each smallest step of navigation defined by the cycle time of the system, the navigation control unit determines the angular correction to apply based on weighted combination of various factors including 1) the angular position of the entity from the start point with respect to the pre-defined navigation path 2) the angular position of the entity from the end point with respect to the pre-defined navigation path 3) the instantaneous orientation of the entity 4) the instantaneous absolute position of the entity 5) the deviation of the entity represented by the perpendicular distance of the entity (200) from the pre-defined navigation path etc. An illustration of these factors is given in FIG. 6. This angular correction computed at each of these smallest steps of navigation are given to the drive wheel control wheel (112).

According to one embodiment herein, the system also includes a drive wheel control unit (112) communicatively coupled to the navigation control unit and configured to control a drive wheel of the entity based on the multi-stage navigation. The drive wheel control unit is communicatively associated with at least one of a left motor and a right motor to control the speed of navigation of the entity. The drive wheel control unit (112) translates the instantaneous angular correction provided by the navigation control unit (110) to instantaneous differential drive wheel speeds using various parameters based on the physical properties of the entity (200) into order achieve the angular correction of the entity (200) physically. The drive wheel control unit (112) monitors the absolute positions of the drive wheels during the entire navigation process and feeds the monitored data to the navigation control unit (110) which in turn provides the instantaneous angular correction for the drive wheel control unit (112) to derive the differential drive wheel speeds for the next iteration. The absolute positions of the drive wheels during the course of navigation are predicted based on 1) current absolute drive wheel positions 2) current maximum speed of the entity 3) cycle time of the system (100) 4) width of the entity (200) and 5) the angular correction to achieve during the iteration. The differential wheel speeds are derived from the difference in predicted angular displacement between the two drive wheels if the entity moves from the current position to a predicted position. Depending up on the direction of rotation of the entity in order to apply the required correction, the outer wheel is applied with the current maximum speed while the inner wheel is applied a speed which is lesser than the current maximum speed by a factor of the difference in predicted angular displacement between the two drive wheels. An illustration of the translation of angular correction to differential wheel speed is given in FIG. 5. Also, to avoid any undesired shaky movement of the vehicle due to sudden jump in speed difference between the two wheels, the drive wheel control unit (112) controls the wheels at a much higher granularity, e.g. at one-tenth of the cycle time of the system (100), by time slicing the differential speed to be applied across the wheel so as to achieve smooth transition and effectively apply the desired angular correction to the entity (200) before the arrival of the next iteration signal from the navigation control unit (110).

According to one embodiment herein, the step of multi-stage navigation in a line segment includes a) initiating a navigation of the entity and ramping-up a speed of the entity, b) performing a course-correction on the entity to orient the entity along a predetermined path and compensating for a residual angle, upon reaching the maximum speed, c) performing stabilization of navigation of the entity for aligning the entity within a deviation limit from the predetermined path; and d) ramping-down the speed of the entity and stopping navigation upon reaching a distance of the entity from a destination point in the line segment within a predetermined limit.

According to one embodiment herein, the step or process of initiating the navigation includes a) determining whether an orientation of the entity is aligned within a predetermined target orientation range based on the absolute orientation of the entity (200) obtained from the absolute orientation unit (106); b) ramping-up the speed of the entity without applying any deviation correction as long as the deviation of the entity from the ideal-path is within acceptable limits; c) deriving a residual angle and then continuing to ramp up the speed of the entity along with applying a deviation correction by the residual angle, when the deviation of the entity from the ideal-path goes beyond (exceeds) acceptable (predetermined) limits; d) performing either step 2 alone or performing a combination of step b and step c until a desired maximum speed is reached.

According to one embodiment herein, the step/process of deriving the residual angle during ramp-up involves finding/determining the slope values of the lines connecting the bot positions with the starting point iteratively at a predetermined periodic interval, averaging the slope values and subtracting the averaged slope value from the absolute orientation of the entity (200) obtained from the absolute orientation unit (106) while initiating a navigation process.

According to one embodiment herein, the step/process of performing the course-correction involves using the residual angle estimated during ramp-up stage and applying the required angular correction to change the course of the entity (200) so as to bring it towards the pre-defined path representing the said line-segment.

According to one embodiment herein, the step/process of performing the stabilization includes determining if a first exit condition is met and performing a stabilization when the first exit condition is met, and wherein the first exit condition is defined as a specific point at which Θ2<k Θ1, where k is the pre-determined factor that decides the exact transition point, and wherein Θ1 is the initial angle of the entity from the starting point with respect to the line segment. Θ2 is the angle of the entity from the starting point with respect to the line segment that keeps varying during course correction as the entity moves towards the pre-defined path representing the line segment, or repeating/continuing the course-correction when the first exit condition is not met. The stabilization includes reversing the course-correction while aligning the entity parallel to the predetermined path and within a deviation limit; and determining if a deviation of the entity from the predetermined path is within a deviation limit; and aligning the entity along the predetermined path when the entity is within the deviation limit from the predetermined path. During the course of stabilization, the sign of the angle correction factor is determined so as to maintain the entity within a deviation limit on either side of the predetermined path. In case of the deviation of the entity going beyond preset deviation limit, repeat course-correction stage.

According to one embodiment herein, the step or the process of ramping-down includes 1) determining if a deviation of the entity from the predetermined path is within a deviation limit, 2) determining if a second exit condition is met, when the deviation is within the preset deviation limit, and wherein the second exit condition is defined as a point in which the remaining distance to the destination point in the line segment is within a predetermined limit; 3) performing the process of ramping down the speed of the entity along with deviation correction to keep the entity along the predetermined path when the second exit condition is met or repeating the stabilization process when the second exit condition is not met, 4) determining if a distance of the entity to the destination point in the line segment is within a predetermined limit based on the instantaneous absolute position of the entity, 5) continuing or repeating the ramping-down process when the distance of the entity from the target location is not within a predetermined limit, and stopping navigation of the entity when the distance of the entity from the target location is within the predetermined limit.

According to one embodiment herein, a method of navigating an entity between any two points through a navigation space is disclosed. The method includes determining at least one of an instantaneous absolute position and an absolute orientation of the entity (200), deciding the navigation strategy that provides the combination of line segments to traverse to reach the final target, for each such line segment, determining and performing a multi-stage navigation of the entity based on the instantaneous absolute position and the absolute orientation of the entity. The multistage navigation process in a line segment includes a) initiating a navigation of the entity and ramping up a speed of the entity, b) performing a course-correction on the entity to orient the entity along a predetermined path and compensating for a residual angle, upon reaching a maximum speed, c) performing stabilization of navigation of the entity for aligning the entity within a deviation limit form the predetermined path, d) ramping-down the speed of the entity and stopping navigation upon a distance of the entity reaching a predetermined limit from a destination point in the line segment.

FIG. 1 illustrates a block diagram of a system for navigating an entity in a navigation space, according to one embodiment herein. As shown in FIG. 1, system 100 includes a position sensing unit 102, an absolute position unit 104, and absolute orientation unit 106, a navigation guidance unit 108, a navigation control unit 110, and a drive wheel control unit 112. The entity may include, for example, a stationary object or a mobile object (such as for example, a mobile factory equipment or vehicle). The navigation space may include an enclosed space with predefined boundaries, such as for example, a space inside a factory unit. The position sensing unit 102 includes a plurality of sensors, disposed on a plurality of locations on the entity (as described in detail along with FIGS. 2A-2B, based on UWB (Ultra-Wideband), Bluetooth, Zigbee, Ultrasound etc., placed in a meaningful manner in the entity and provides an approximate representation of location of each such individual sensor. The absolute position unit 104 is configured to determine the instantaneous absolute position and the absolute orientation unit 106 is configured to determine an absolute orientation of the entity. According to one embodiment of the present invention, the navigation guidance unit course 108 provides a set of attributes to enable a successful navigation in the given navigation space. According to one of the embodiments, the navigation control unit 110 uses the attributes given by the navigation guidance unit 108 to perform navigation between any two points in the given navigation space. To perform the navigation, the said navigation path is split into multiple line segments and navigation on each such line segment is performed using a multi-stage navigation mechanism. On completing the navigation of all such line segments and reaching the desired target within acceptable limit, the said navigation is considered to be successfully completed. According to one embodiment of the present invention, the multi-stage navigation in a line segment includes a) initiating a navigation of the entity and ramping-up a speed of the entity, b) performing a course-correction on the entity to orient the entity along a predetermined path and compensating for the residual angle, upon reaching the maximum speed, c) performing stabilization of navigation of the entity for aligning the entity within a deviation limit form the predetermined path, and d) ramping-down the speed of the entity and stopping navigation upon the entity distance of the entity reaching a predetermined limit from a destination point in the line segment. According to one embodiment of the present invention, the drive wheel control unit 112 translates the angular correction provided by the navigation control unit 110 to differential speeds to be applied on the drive wheels physically.

Figure 2A:
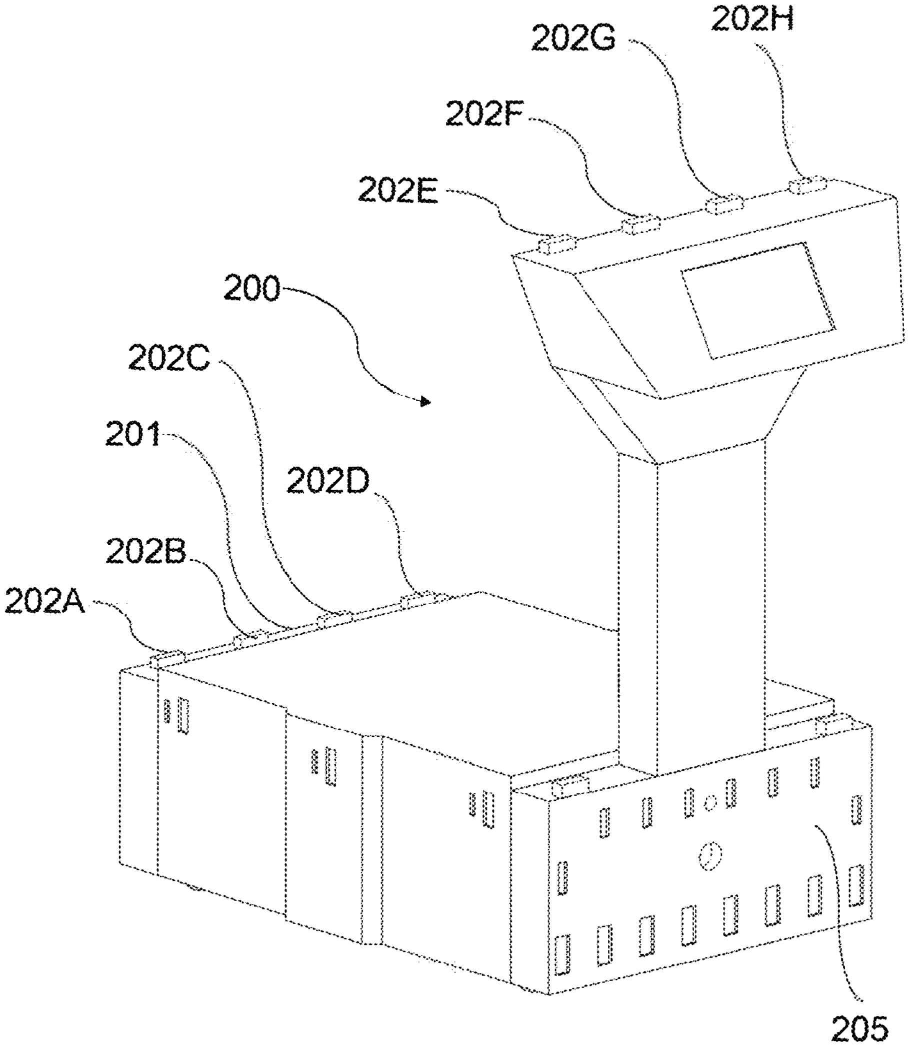
FIG. 2A illustrates a perspective view of an entity (robot) installed with a set of position sensors at a plurality of locations, according to one embodiment herein.
Figure 2B:
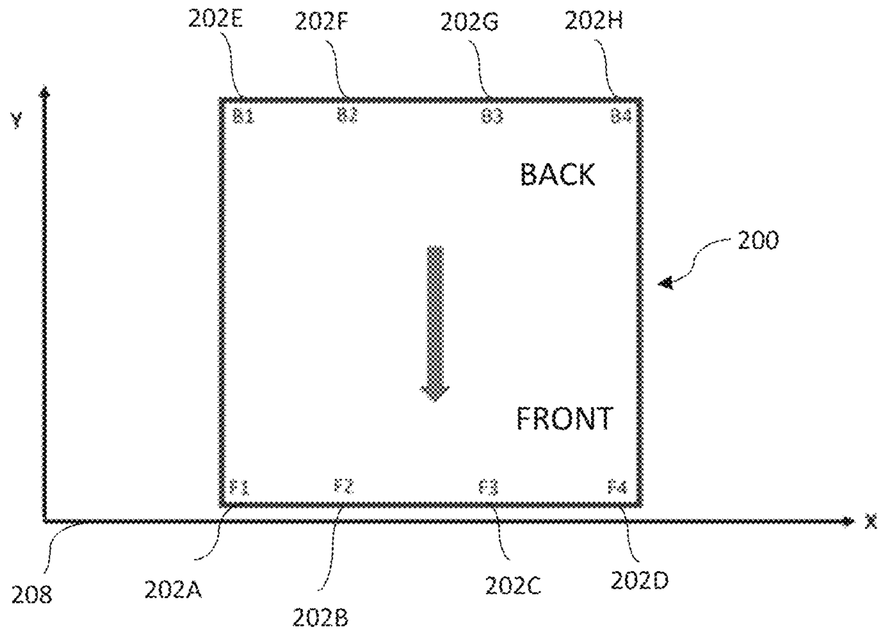
FIG. 2B illustrates a top view of an entity (robot) installed with a set of position sensors at the plurality of locations, according to one embodiment herein.

FIG. 2A illustrates a perspective view of an entity (robot) installed with a set of sensors at the plurality of locations, according to one embodiment herein. As shown in FIG. 2A, the entity 200 includes a front end 201 and a rear end 205. The set of sensors 202A-H includes a front set of sensors 202A-D disposed on the front end 201 and a rear set of sensors 202 E-H disposed on the rear end 205, of the example entity 102.

FIG. 2B illustrates a top view of an entity (robot) installed with a set of sensors at the plurality of locations, according to one embodiment herein. FIG. 2B illustrates a top view representation of positioning of the set of sensors 202A-H on the example entity 200 in an X-Y plane 208. As depicted in FIG. 2B the points F1 to F4 and the points B1 to B4 represent the positioning of the sensors 202A-D and 202E-H respectively. The sensors 202A-H are positioned in a manner as shown in FIG. 2A to achieve a three-dimensional spatial diversity. The sensors 202A-H provide the location information for each pre-defined position where each of these sensors are physically placed. Using the time-averaged location information of the said pre-defined points in the said entity (200) obtained using the position sensing unit (102), we can construct a combination of unique vectors each of which has known angular relationship with a given axis of the said entity (200) representing the heading or the absolute orientation of the entity in the XY plane 208.

According to one embodiment herein, the absolute orientation unit (106) constructs a combination of vectors each of which has a known angular relationship with a given axis of the said entity (200) represented by a bold arrow as illustrated in FIG. 2B which is the heading or the absolute orientation of the entity. Each such vector is constructed by connecting any two said pre-defined points or any two points representing a combination of such pre-defined points.

Example vector constructions and their associated angular offset with respect to the absolute orientation of the entity are given below:

a) Vectors B1B4 and F1F4 have an angular offset of 90 degrees.
b) Vectors B1F1 and B4F4 have an angular offset of 90 degrees.
c) Vectors B1F4 and B4F1 have an angular offset same as the diagonal but averaging them nullifies the offset and gives a direct representation of the absolute orientation of the entity (200)
d) Vector can also be formed by connecting two points, one being the average position representation of B1B2B3B4 and the other being the average position representation of F1F2F3F4. This vector would have zero angular offset.

Innumerous such combination of vectors with an angular relationship with the absolute orientation of the entity can be constructed. Each such vector's absolute orientation along with its direction sense provide a measure of the desired absolute orientation of the entity (200) with a known angular offset. Applying the respective known offset to each such vector's orientation provides a unique representation of the absolute orientation of the entity (200). Weighted averaging of all such angles provides a reliable absolute orientation of the entity (200).

Figure 3A:
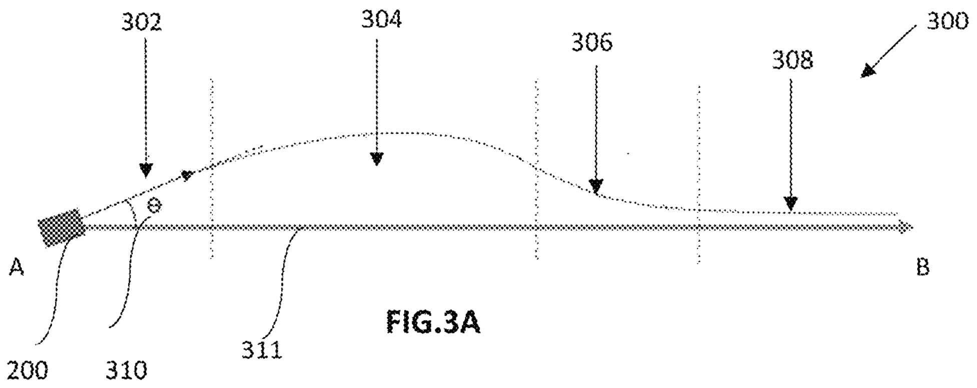
FIGS. 3A-3C illustrate a multi-stage navigation process performed by the system of navigation process, according to one embodiment herein.
Figure 3B:
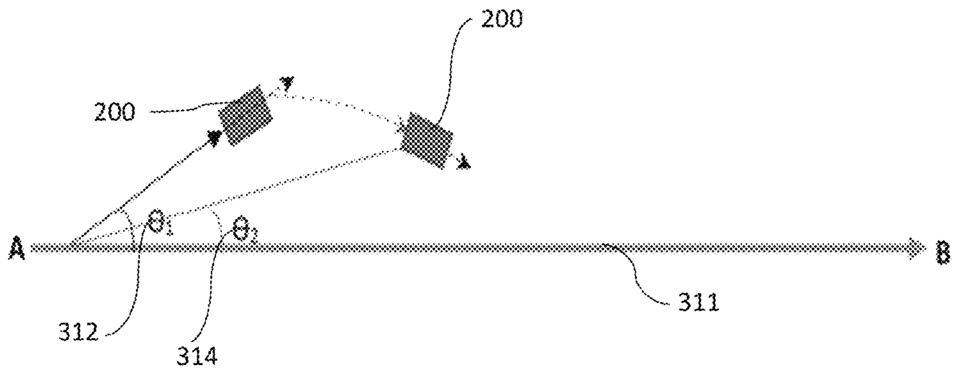
Figure 3C:
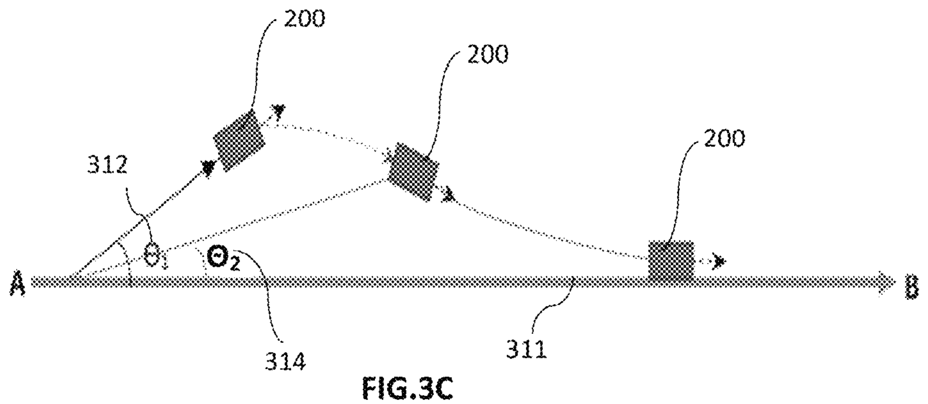

FIGS. 3A-3C course illustrate a multi-stage navigation process performed by the system of navigation process, according to one embodiment herein. More particularly, FIG. 3A depicts a curve 300 representing the multi-stage navigation performed by system 100 of the present technology. According to one embodiment of the present invention, the multi-stage navigation includes a ramp-up stage 302, a course-correction stage 304, a stabilization stage 306, and a ramp-down 308. In the ramp-up stage 302, a navigation of the entity 200 is initiated. It is determined if an orientation of the entity 200 is aligned within a predetermined target orientation range. Ramping-up the speed of the entity is first initiated without applying any deviation correction as long as the deviation of the entity from the ideal-path is within acceptable limits; If the deviation of the entity from the ideal-path goes beyond acceptable limits, deviation correction is applied along with ramp-up based on a residual angle (Θ)310. During course-correction stage 304, with a better understanding of the orientation of the entity from the hand off point of the ramp-up stage, apply angular correction to change the course of the entity so as to bring it towards the pre-defined path 311.

FIG. 3B illustrates a curve depicting the course-correction stage 304 with the residual angle changing from Θ1 312 to $\Theta_2$ 314 as a consequence of the course correction. Course correction is stopped at a first exit condition. The first exit condition is defined as a specific point at which Θ2<k Θ1, where k is the pre-determined factor that decides the exact transition point, and wherein Θ1 is the initial angle of the entity from the starting point with respect to the line segment, and Θ2 is the angle of the entity from the starting point with respect to the line segment that keeps varying during course correction as the entity moves towards the pre-defined path representing the line segment. During the stabilization stage 306, a stabilization is performed by: reversing the course correction while aligning the entity 200 parallel to the predetermined path 311 and within a deviation limit. It is determined if a deviation of the entity 200 from the predetermined path 311 is within a deviation limit, and the entity 200 is aligned along the predetermined path 311 and within the deviation limit from the predetermined path 311. During the course of the stabilization stage 306, track the trajectory trend of the entity (200) and change the sign of the angle correction factor so as to maintain the entity within a deviation limit on either side of the predetermined path.

FIG. 3C illustrates a curve depicting the stabilization stage 306. As depicted in FIG. 3C, the residual angle tends to zero from $\Theta_2$ 314 the entity 200 moves closer to the predetermined path 311 as a consequence of stabilization. During the ramp-down stage 308, the speed of the entity 200 is ramped down along with deviation correction to keep the entity 200 along the predetermined path 311. FIG. 3C illustrates a curve depicting the ramp-down stage 308. The multi-stage navigation process is described further along with FIGS. 3D and 3E.

Figure 3D:
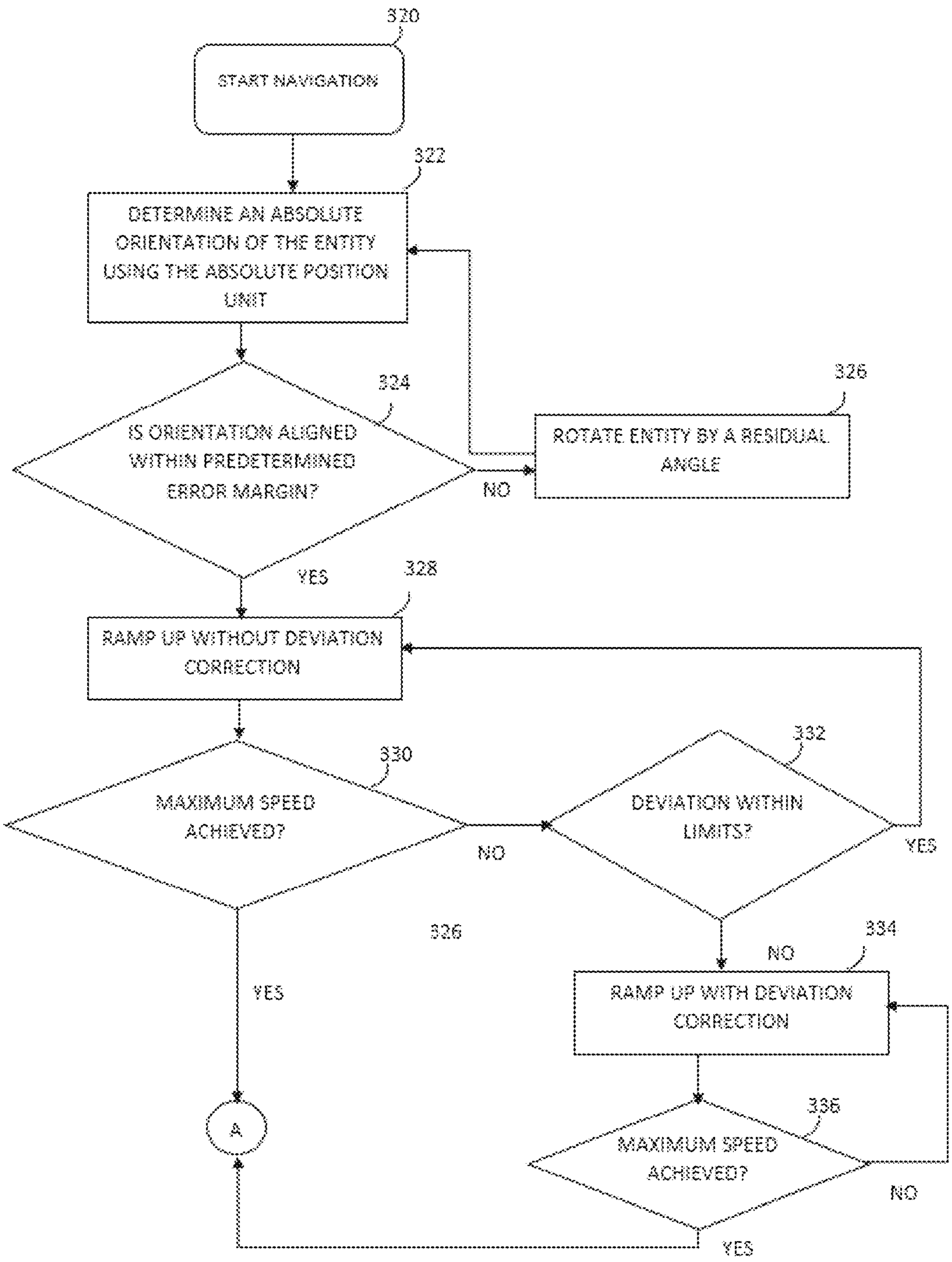
FIGS. 3D-3E illustrate a flow chart explaining a process of multi-stage navigation process, according to one embodiment herein.
Figure 3E:
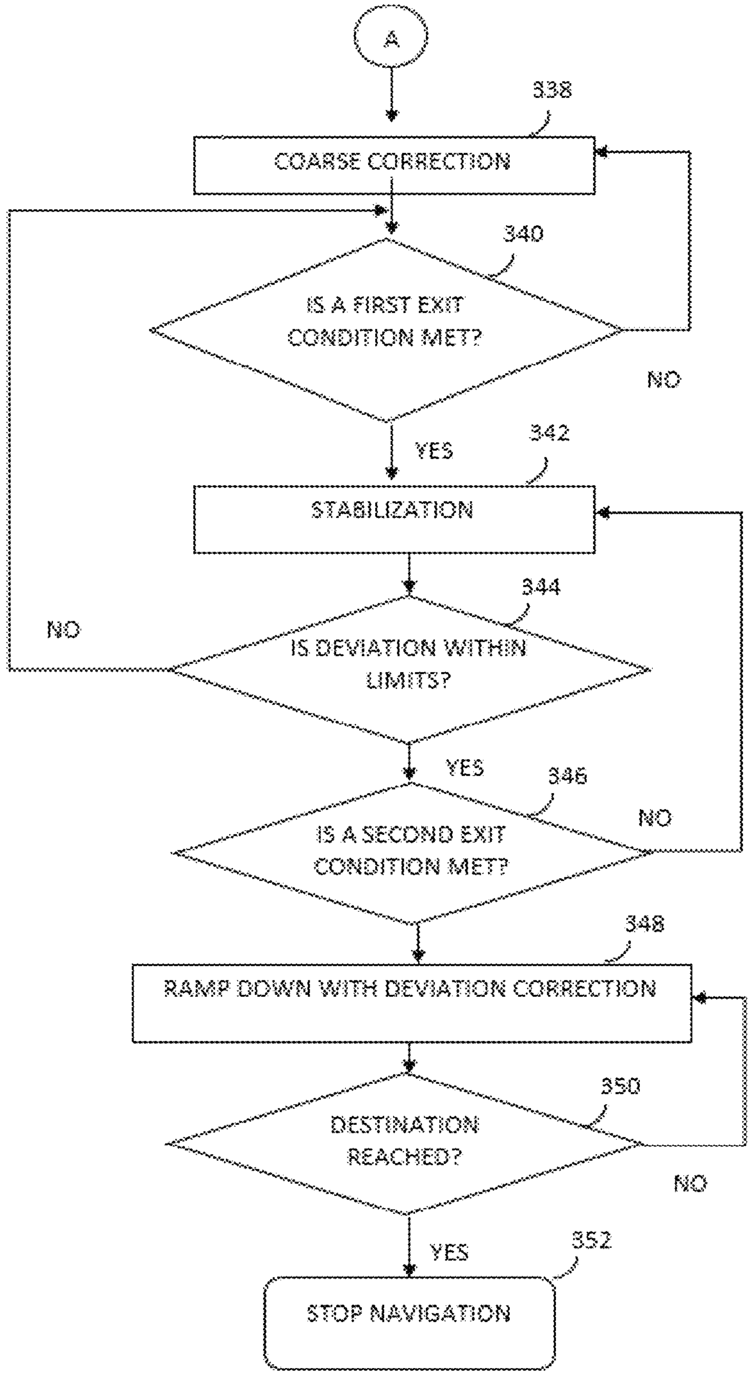

FIGS. 3D-3E illustrates a flow chart explaining a process of multi-stage navigation process in a line segment, according to one embodiment herein. FIGS. 3D-3E depicts a process flow diagram illustrating a process of multi-stage navigation performed by the system 100, in accordance with an embodiment. In an embodiment, at step 320, a navigation of the entity 200 is initiated. At step 322, an absolute orientation of the entity 200 is determined using the absolute orientation unit 106. At step 324, it is determined if an orientation of the entity 200 is aligned within a predetermined error limit. At step 326, upon the orientation not being within the predetermined error limit, the entity is rotated to correct its orientation towards the destination point in the line segment thus reducing the error. Steps 322 to 324 are repeated until the entity is oriented towards the target within the predetermined error limit. At step 328, the speed of the entity is ramped up without applying the deviation correction, when the deviation of the entity 200 from a predetermined path 311 is within a pre-determined deviation limit. At step 330, it is determined if a maximum speed is achieved. Upon the maximum speed not being achieved, at step 332 it is determined if the deviation is within limits. Upon the deviation being within limits steps 328 to 332 are repeated. Upon the deviation not being within limits, at step 334, the speed of the entity is ramped up with deviation correction. At step 336, it is determined if a maximum speed is achieved. Upon maximum speed not being achieved, steps 334 and 336 are repeated. Upon maximum speed being achieved, at step 338, a course correction is performed to orient the entity along the predetermined path 311 while compensating for the residual angle. At step 340 it is determined if a first exit condition is met, and wherein the first exit condition is defined as a specific point at which Θ2<k Θ1, where k is the pre-determined factor that decides the exact transition point, and wherein Θ1 is the initial angle of the entity from the starting point with respect to the line segment. Θ2 is the angle of the entity from the starting point with respect to the line segment that keeps varying during course correction as the entity moves towards the pre-defined path representing the line segment. Upon the first exit condition not being met at step 340, step 338 is repeated. Upon the first exit condition being met, at step 340 a stabilization is performed on the entity. During stabilization, the course correction is reversed while aligning the entity parallel to the predetermined path 311 and within a deviation limit, it is determined if a deviation of the entity from the predetermined path 311 is within a deviation limit, and the entity is aligned along the predetermined path 311 and within the deviation limit from the predetermined path 311.

At step 344, it is determined if the deviation is within the deviation limit. Upon the deviation being within the limit, at step 346 it is determined if a second exit condition is met, and wherein the second exit condition is defined as a point in which the remaining distance to the destination point in the line segment is within a predetermined limit. Upon the deviation not being within the limit, steps 338 to 344 are repeated. Upon the second exit condition being met at step 346, at step 348, the speed of the entity is ramped down with a deviation correction. Else, upon the second exit condition not being met at step 346, steps 342 to 346 are repeated. At step 350, it is determined if the destination is reached. Upon reaching the destination at step 350, the navigation stops at step 352. Else upon not achieve the maximum speed, steps 348 to 350 are repeated.

Figure 3F:
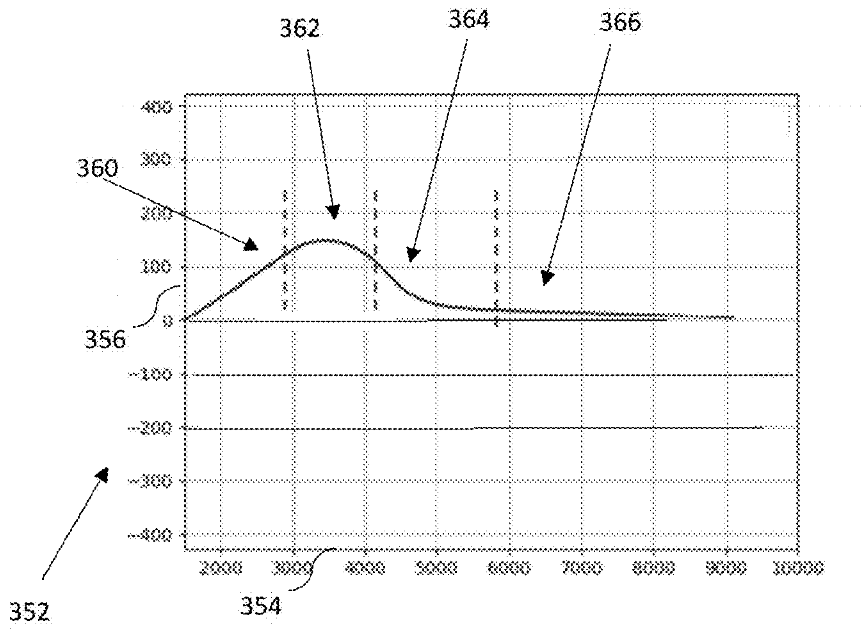
FIG. 3F illustrates a simulated a multi-stage navigation process, according to one embodiment herein.

FIG. 3F illustrates a chart indicating a multi-stage navigation process, according to one embodiment herein. As depicted in FIG. 3F, the simulated trajectory 352 is a graph obtained by plotting a distance of travel (in millimeters) of the entity along an X-axis 354 against a deviation (in millimeters) from the predetermined path 311 along a Y-axis 356. The simulated trajectory 352 includes a ramp-up stage 360, a course correction stage 362, a stabilization stage 364, and a ramp-down stage 366. As can be observed from the simulated trajectory 322, a maximum deviation in this case is contained to less than the entity is not allowed to traverse to the other side.

Figure 3G:
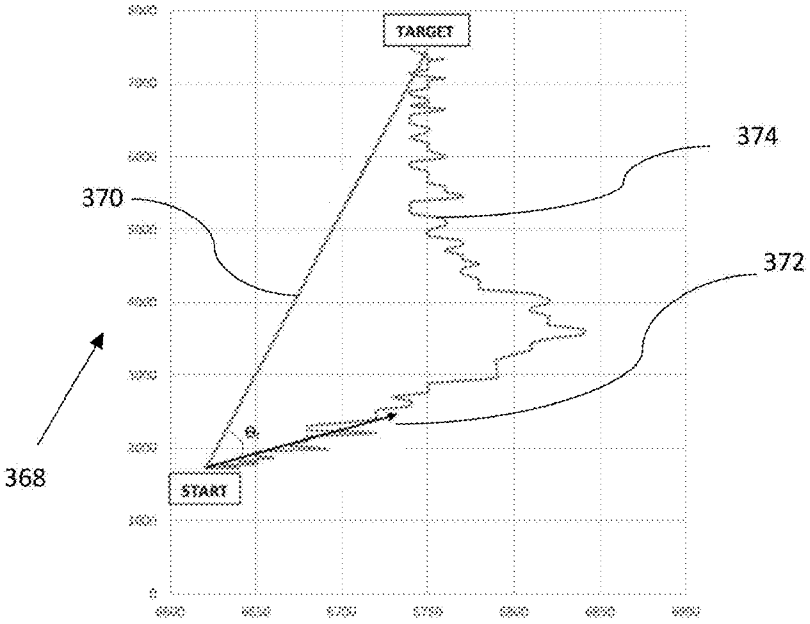
FIG. 3G illustrates a chart indicating an actual trajectory of the entity autonomously driven between two points in a line segment based on multi-stage navigation process, according to one embodiment herein.

FIG. 3G illustrates a chart indicating an actual bot trajectory based on absolute position system 104 for multi-stage navigation process in a line segment, according to one embodiment herein. The trajectory 368 includes an ideal path 370 and an initial direction 372 with a residual angle θ. Also, the stabilized path after course correction towards the destination point in the line segment is represented by 374.

Figure 4:
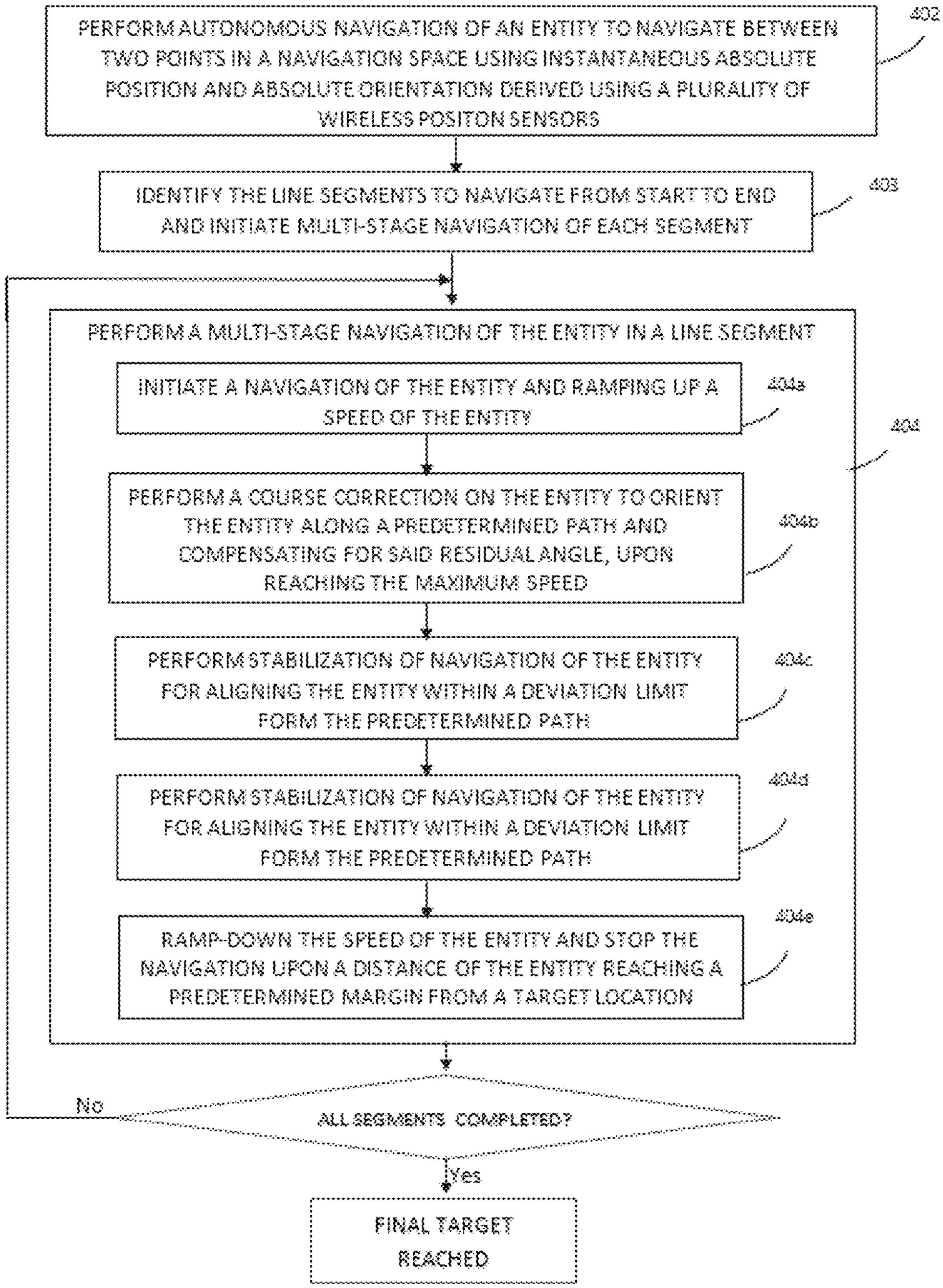
FIG. 4 illustrates a flow chart explaining a method of navigating an entity autonomously between any two points spanning multiple line segments in a navigation space, according to one embodiment herein.

FIG. 4 illustrates a flow chart explaining a method of navigating an entity along a predetermined path in a navigation space, according to one embodiment herein. At step 402, at least one of an instantaneous absolute position and an absolute orientation of the entity is determined and navigation between any two points is initiated. At step **403*a*11 the line segments to navigate so as to optimally reach from the start to the final target are identified. At step 404, a multi-stage navigation of the entity for a line segment is performed based on the instantaneous absolute position and the instantaneous absolute orientation of the entity. At sub-step 404*a* of the multi-stage navigation, a navigation of the entity is initiated, and the speed of the entity is ramped-up. At sub-step 404*b*, a course correction is performed on the entity to orient the entity along a predetermined path and compensating for the residual angle, upon reaching the maximum speed. At sub-step 404*c* a stabilization of navigation of the entity is performed for aligning the entity within a deviation limit form the predetermined path. At sub-step 404*d*, the speed of the entity is ramped down and the navigation of the entity is stopped upon a distance of the entity reaching a predetermined limit from a destination point in the line segment. The steps of 404*a* to 404*d* for each line segment identified in 403** are repeated until all line segments are navigated and the target is reached.

FIG. 5 illustrated the mechanism used by the drive wheel control unit to translate the instantaneous angular correction provided by the navigation control unit (110) to instantaneous differential drive wheel speeds using various parameters based on the physical properties of the entity (200) into order achieve the angular correction of the entity (200) physically. The drive wheel control unit (112) monitors the absolute positions of the drive wheels throughout the navigation in order to derive the differential drive wheel speeds for the next iteration based on the instantaneous angular correction received from the navigation control unit (110). In FIG. 5, from the initial position 501 of the entity (200), with an angular correction of Θ, the entity would reach the updated position 502. This angular correction Θ leads to differential angular displacement between the outer wheel 503 and the inner wheel 504 which is a function of Θ and the width ‘w’ of the entity. As illustrated in FIG. 5, the speed of the inner wheel is obtained by subtracting w*Θ from the speed of the outer wheel. Applying the current maximum speed of the entity to the outer wheel, the reduced speed of the inner wheel can be derived.

FIG. 6 illustrates the significance of various parameters used to calculate angle correction factor as part of controlling the entity during navigation, according to one embodiment herein. Typical usage of a combination of these parameters during different stages of the multi-stage navigation of the entity is illustrated as well.

The various embodiments of system and process to realize and navigate a cost-effective autonomous entity in a time varying indoor navigation space disclosed herein facilitates navigating between any two points in the said navigation space by splitting the navigation path in to multiple line segments, and for each such line segment to navigate, orienting the starting angle of the entity within a limit of, say 5 degrees accuracy, followed by initiating a multi-stage navigation mechanism in order to ensure stabilized control of the entity and maintaining the trajectory of the entity along the ideal path defined the line segment until the destination point in the line segment is reached, and repeated the same every such line segment to reach the final target. Moreover, the multi-stage navigation process of the present technology facilitates achieving at least one of a) minimizing deviation from an ideal path, 2) an earliest course correction and follow through navigation in a straight line, and 3) graceful arrival at the target in a straight line parallel to the ideal path. During the course of navigation, any external factor like uneven floor surfaces, floor friction, multi-path wireless signal degradation etc., leading to deviation of the entity beyond acceptable limits is closely monitored and the navigation strategy is dynamically changed so as to reach the target successfully including deciding on course correction and initiation of new cycle of multi-stage navigation, based on the assessment of the dynamically experienced conditions and in turn the instantaneous absolute position and the absolute orientation of the entity.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications.

We claim:

1. A system for navigating an entity through a time-varying indoor navigation space, said system comprising:

a position sensing unit having comprising a plurality of positioning sensors placed in a preset manner, said plurality of positioning sensors installed on a plurality of pre-defined points in a multi-dimensional space on an entity in the preset manner, thereby enabling a geometrical inference of the entity, based on a location information provided by each of the positioning sensors;

an absolute position unit configured to provide an instantaneous absolute position of the entity in a time-varying indoor navigation space, based on the location information provided by each of the positioning sensors embodied in a position sensing unit, and wherein the location information corresponds to the plurality of pre-defined points in the time-varying indoor navigation space;

an absolute orientation unit configured to provide an absolute orientation of the entity based on the instantaneous absolute position of the entity, determined by an absolute position unit, said absolute orientation unit further configured to derive a refined representation of the absolute orientation of the entity based on an individual locations of the pre-defined points and an absolute orientation of a set of unique vectors, the set of unique vectors constructed using a combination of a time-averaged location information corresponding to said plurality of pre-defined points in the time-varying indoor navigation space and a relationship between said pre-defined points and the absolute orientation of the entity, and wherein the set of unique vectors entail a known angular relationship to a given axis of the entity, and wherein the set of unique vectors with the known angular relationship to the given axis of the entity represent a direction and the absolute orientation of an entity with a known angular offset, and wherein each of the unique vectors is constructed by connecting any two of said pre-defined points or by connecting any two points formed as an average position representation of said any two pre-defined points and wherein each of the unique vectors' absolute orientation along with a direction provides a measure of a desired absolute orientation of the entity with the known angular offset, and wherein the known angular offset is applied to each of the unique vectors absolute orientations to provide a unique representation of the absolute orientation of the entity, and wherein a weighted averaging of the known angular offsets applied to each of the unique vectors' absolute orientations provides a refined representation of the absolute orientation of the entity;

a navigation guidance unit configured to provide a plurality of attributes based on a navigable layout identified in the time-varying indoor navigation space for navigating the entity towards a desired target position;

a navigation control unit configured to control/regulate a navigation of the entity between any two points in a the time-varying indoor navigation space autonomously based on the instantaneous absolute position of the entity, provided by the absolute position unit, the absolute orientation of the entity provided by the absolute orientation unit, and the plurality of attributes provided by the navigation guidance unit;

a drive wheel control unit communicatively coupled to the navigation control unit and configured to control a plurality of drive wheels of the entity by applying an instantaneous angular correction to the entity, and wherein the instantaneous angular correction to be applied to the entity is obtained from the navigation control unit and translated into instantaneous differential speeds that drive the plurality of drive wheels of the entity based on drive wheel parameters, and wherein the drive wheel control unit is configured for controlling the plurality of drive wheels during the navigation of the entity.

2. The system as claimed in claim 1, wherein the absolute position unit refines the instantaneous absolute position of the entity based on the time-averaged location information and a predefined geometrical relationship between a plurality of sensors embodied in the position sensing unit, and wherein the the time-averaged location information is transformed into an ideal absolute point of the entity using a translation vector representing a pre-defined position of each of the plurality of positioning sensors, and wherein the instantaneous absolute position corresponding to the ideal absolute point of the entity is generated by averaging translated positions of each of the plurality of positioning sensors and after applying a predetermined statistical correction.

3. The system as claimed in claim 1, wherein the time-averaged location information of said pre-defined points is generated using the position sensing unit.

4. The system as claimed in claim 1, wherein the plurality of attributes are extracted from the navigable layout identified in the time-varying indoor navigation space to enable the navigation control unit to relate with a context of the navigable layout, and wherein one or more of the attributes are updated dynamically based on feedback obtained from a navigation history of the entity, and wherein the navigable layout is divided into a plurality of navigable line segments connected by nodes whose absolute coordinates are recorded on a map, and wherein the plurality of navigable line segments form a part of a set of valid paths constituting a network of valid paths, and wherein the plurality of attributes correspond to the network of valid paths and are recorded on the map, and wherein the plurality of attributes are selected from a group consisting of cost, path width, speed limit, intermediate node transition angles, node angular offset, and node flags, and wherein an optimal path for the navigation of the entity between any two of the pre-defined points is arrived at in real-time based on a minimum total cost which includes a cost to traverse a combination of the nodes to reach the desired target position, distance between the entity and a nearest node, and a penal cost for every intermediate node visited, and wherein measurement error in said absolute orientation of the entity at a particular node is estimated by the navigation control unit during a course of the navigation starting from said particular node, and wherein estimated measurement error is recorded on the map as the known angular offset at each node while orienting towards a target node, and wherein a recorded known angular offset is applied to the absolute orientation of the entity during subsequent navigations from same starting node to same target node, and wherein the recorded known angular offset is applied to the absolute orientation of the entity during the navigation of each of the navigable line segments, and wherein the recorded known angular offset for a given pair of the starting node and the target nodes is continuously refined and dynamically updated in on the map.

5. The system as claimed in claim 4, wherein the navigation control unit is configured to perform the navigation of the entity between any two of the pre-defined points in the navigation space so as to reach the desired target position, and wherein the navigation of the entity is divided based on a number of the navigable line segments involved in reaching the desired target position optimally, and wherein each of the navigable line segments is navigated by using a multi-stage navigation mechanism of the navigation control unit to maintain the navigation of the entity along a predetermined path defined by each of the navigable line segments, and wherein the multi-stage navigation mechanism comprises orienting the entity initially towards a destination point in one of the navigable line segments within predetermined deviation limit, based on the absolute orientation of the entity and wherein the navigation control unit is configured to:

ramp-up a speed of the entity;

perform a course-correction on the entity to orient the entity along the predetermined path, and compensating for a residual angle, upon the entity reaching a desired maximum speed;

perform stabilization of the navigation of the entity for aligning the entity within the predetermined deviation limit from the predetermined path; and ramp down said speed of the entity and stop the navigation upon a distance of the entity from the destination point in the one of the navigable line segments reaching the predetermined deviation limit from said desired target position.

6. The system as claimed in claim 1 or 5, wherein:

the speed of the entity is ramped-up by the navigation control unit by estimating an improved representation of absolute orientation of the entity and by averaging slopes of lines connecting the instantaneous absolute position of the entity with a starting point iteratively at predetermined periodic intervals to determine a residual angle introduced in the absolute orientation of the entity due to multi-path reflections, and wherein the residual angle is determined by subtracting an averaged slope value from the absolute orientation of the entity during an initiation of the navigation of the entity, and wherein said residual angle is attributed to the starting node when oriented towards a specific target node, and wherein the residual angle is dynamically updated in the navigation guidance unit as node angular offset to be accounted for subsequent and new navigations before ramping-up the speed of the entity, and wherein estimated residual angle is used in the instantaneous angular correction of said entity, and wherein ramping-up the speed of the entity is continued in a straight-line until the desired maximum speed is reached or when a deviation from the predetermined path exceeds the predetermined deviation limit, the instantaneous angular correction of said entity is continually applied to minimize the deviation of the entity from the predetermined path, when the desired maximum speed is not reached;

the navigation control unit performs the course-correction of the entity by applying the instantaneous angular correction to change the course of the entity to bring the entity towards the predetermined path representing the one of the navigable line segments, and wherein the instantaneous angular correction is implemented by the drive wheel control unit by translating the instantaneous angular correction to the instantaneous differential speeds that drive the plurality of the drive wheels of the entity;

the navigation control unit applies reverse correction to move the entity to align with a trajectory of the predetermined path and to avoid crossover of the entity to another side of the predetermined path during the course-correction of the entity, thereby stabilizing the entity gradually to arrive at the destination point in the one of the navigable line segments, and wherein a trajectory of the entity is tracked and a sign of the instantaneous angular correction is changed so as to maintain the entity within the predetermined deviation limit on either side of the predetermined path, and wherein the course-correction is repeated on the entity and the stabilization of the navigation of the entity is continued, when a position of the entity has deviated from the predetermined path beyond an acceptable threshold level during the stabilization of the entity due to floor imperfections, mechanical imperfections, or measurement inaccuracies;

the navigation control unit ramps down the speed and maintains the absolute orientation of the entity until the entity reaches a point within the predetermined deviation limit from the destination point in the one of the navigable line segments, and wherein the speed of the plurality of drive wheels is gradually ramped-down along with the instantaneous angular correction until the entity arrives near the desired target position within the predetermined deviation limit; and the navigation control unit derives an instantaneous orientation of the entity by tracking an angle of a line segment connecting the drive wheels of the entity that has a fixed angular offset with the orientation of the entity, and wherein a starting angle of the line segment is derived from the absolute orientation of the entity provided by the absolute orientation unit at a start of the navigation of the entity, and wherein an instantaneous orientation of the line segment is derived during the navigation of the entity, by using an absolute position of the drive wheels provided by the drive wheel control unit, and wherein the instantaneous orientation of the entity is derived by applying the fixed angular offset to the instantaneous orientation of the line segment connecting the drive wheels of the entity.

7. The system as claimed in claim 6, wherein the navigation control unit computes and applies the instantaneous angular correction to the entity iteratively at a predetermined periodic intervals to achieve a perfect alignment of the entity along the predetermined path, and wherein the instantaneous angular correction is computed based on weighted combination of a plurality of parameters including:

an angular position of the entity from the starting point with respect to the predetermined path;

the angular position of the entity from an end point with respect to the predetermined path;

the instantaneous orientation of the entity;

the instantaneous absolute position of the entity; and the deviation of the entity represented by a perpendicular distance of the entity from the predetermined path;

and wherein the instantaneous angular correction is derived based on a weighted combination of the plurality of the parameters.

8. The system as claimed in claim 6, wherein the navigation control unit is configured to continuously monitor the instantaneous absolute position and the trajectory of the entity iteratively at predetermined periodic intervals and dynamically decide a navigation strategy by either continuing with ongoing course of the navigation or performing an orientation correction followed by a new navigation cycle for the line segment, and wherein the deviation of the entity beyond the predetermined deviation limit, due to the floor imperfections leading to wheel slippages and the multi-path reflections leading to signal degradation, triggers the orientation correction and initiation of the new navigation cycle, and wherein the orientation correction and the initiation of the new navigation cycle is triggered by considering a future trajectory of the entity, even when the deviation is within the predetermined deviation limits; and wherein, when the entity starts the new navigation cycle with the orientation having a large residual angle not reported appropriately by the absolute orientation unit due to the multi-path reflections, thereby leading the entity to stray away from a desired path and move towards obstacles, including walls adjacent to the predetermined path, the navigation control unit judges that a path taken by the entity is invalid and initiates the navigation through a next best optimal path, when the entity is obstructed or stopped in the path beyond a predetermined time limit and the course-correction does not provide for the initiation of the new navigation cycle.

9. The system as claimed in claim 6, wherein the drive wheel control unit is configured to translate the instantaneous angular correction provided by the navigation control unit to the instantaneous differential speeds using a plurality of parameters based on physical properties of the entity to achieve the instantaneous angular correction of the entity physically, and wherein the drive wheel control unit monitors absolute positions of the drive wheels throughout the navigation of the entity and feeds monitored absolute positions of the drive wheels to the navigation control unit which provides the instantaneous angular correction for the drive wheel control unit to derive the instantaneous differential speeds for a next iteration, and wherein the absolute positions of the drive wheels are derived at the start of the navigation from the instantaneous absolute position of the entity provided by the absolute position unit and the absolute orientation of the entity provided by the absolute orientation unit, and wherein the absolute position of the drive wheels during the navigation are determined based on current absolute drive wheel positions, current maximum speed of the entity, duration of an iteration, width of the entity and the instantaneous angular correction to be achieved during the iteration, and wherein the instantaneous differential speeds are derived from a difference in an estimated angular displacement between two drive wheels of the entity when the entity moves from a current position to an estimated position, and wherein an outer wheel of the entity is applied with the current maximum speed while an inner wheel of the entity is applied a speed lesser than the current maximum speed by a factor of the difference in the estimated angular displacement between the two drive wheels, depending on a direction of rotation of the entity, and wherein the drive wheel control unit controls the two drive wheels by time slicing the instantaneous differential speed to be applied to the two drive wheels of the entity and avoid undesired shaky movement of the entity due to a sudden jump in a speed difference between the two drive wheels, so as to effectively apply the instantaneous angular correction to the entity before an arrival of a next iteration signal from the navigation control unit.

* * * * *